(12) United States Patent
Paradise et al.

(10) Patent No.: US 7,234,284 B2
(45) Date of Patent: Jun. 26, 2007

(54) COMPOSITION AND METHOD FOR ROOFING MATERIAL INSTALLATION

(75) Inventors: Richard W. Paradise, Shawnee, KS (US); William E. Kugler, Denver, CO (US)

(73) Assignee: Innovative Adhesives Company, Kansas City, KS (US)

( * ) Notice: Subject to any disclaimer, the term of this patent is extended or adjusted under 35 U.S.C. 154(b) by 265 days.

(21) Appl. No.: 10/379,229

(22) Filed: Mar. 4, 2003

(65) Prior Publication Data

US 2004/0172899 A1 Sep. 9, 2004

(51) Int. Cl.
*E04B 1/00* (2006.01)

(52) U.S. Cl. .............. 52/745.06; 52/746.11; 52/DIG. 16; 52/518; 52/748.1; 156/72

(58) Field of Classification Search ............. 52/745.21, 52/746.11, 747.1, 748.1, DIG. 16, 408, 409, 52/46.11, 745.06, 518; 156/74, 71, 82, 247, 156/337, 72, 289, 325; 40/40, 137, 291
See application file for complete search history.

(56) References Cited

U.S. PATENT DOCUMENTS

| | | | | |
|---|---|---|---|---|
| 3,937,640 A * | 2/1976 | Tajima et al. | ............... | 156/71 |
| 4,235,058 A * | 11/1980 | Patry | ..................... | 52/408 |
| 4,253,058 A * | 2/1981 | Kachel et al. | ............ | 324/71.1 |
| 4,386,981 A * | 6/1983 | Clapperton | ............. | 156/71 |
| 4,588,458 A * | 5/1986 | Previsani | ................ | 156/71 |
| 4,640,730 A | 2/1987 | Streets et al. | | |
| 4,668,315 A * | 5/1987 | Brady et al. | ............... | 156/71 |
| 4,670,071 A * | 6/1987 | Cooper et al. | ............. | 156/71 |
| 4,707,961 A * | 11/1987 | Nunley et al. | ............. | 52/408 |
| 4,757,652 A * | 7/1988 | Kalkanoglu | ............. | 52/420 |
| 4,783,942 A * | 11/1988 | Nunley et al. | ............ | 52/309.1 |
| 4,852,323 A * | 8/1989 | Kartfilt | ................. | 52/410 |
| 4,855,172 A * | 8/1989 | Chiu | ..................... | 428/57 |
| 4,881,996 A | 11/1989 | Nussbaum et al. | | |
| 4,992,315 A * | 2/1991 | Zickell et al. | ............ | 428/40.3 |
| 4,996,803 A * | 3/1991 | Karrfalt et al. | ............ | 52/96 |
| 5,024,886 A * | 6/1991 | Geisen et al. | ............. | 428/332 |
| 5,142,837 A * | 9/1992 | Simpson et al. | ........... | 52/409 |
| 5,204,148 A * | 4/1993 | Alexander et al. | ........ | 428/41.8 |
| 5,253,461 A * | 10/1993 | Janoski et al. | ............. | 52/408 |
| 5,392,583 A * | 2/1995 | Gregory | ................. | 52/741.1 |
| 5,421,876 A * | 6/1995 | Janoski | ................. | 106/278 |
| 5,447,006 A * | 9/1995 | Zenor | ................... | 52/741.4 |
| 5,486,249 A | 1/1996 | Valaitis et al. | | |
| 5,540,022 A * | 7/1996 | Morris | .................. | 52/309.8 |
| 5,580,638 A * | 12/1996 | Kiser | ..................... | 428/143 |
| 5,644,880 A * | 7/1997 | Lehnert et al. | ............ | 52/408 |
| 5,737,897 A * | 4/1998 | Naipawer, III | ........... | 52/796.1 |
| 6,023,906 A * | 2/2000 | Folkersen | .............. | 52/746.11 |
| 6,036,804 A * | 3/2000 | Rayburn et al. | ........... | 156/224 |
| 6,117,375 A | 9/2000 | Garrett et al. | | |
| 6,130,268 A * | 10/2000 | Murray | ................. | 521/131 |
| 6,134,856 A * | 10/2000 | Khan et al. | ............... | 52/536 |
| 6,308,482 B1 * | 10/2001 | Strait | .................... | 52/408 |
| 6,502,360 B2 * | 1/2003 | Carr et al. | ............... | 52/408 |
| 6,641,896 B2 * | 11/2003 | Fensel et al. | ............. | 428/141 |
| 6,679,018 B2 * | 1/2004 | Georgeau et al. | ......... | 52/408 |
| 6,701,685 B2 * | 3/2004 | Rippey | .................. | 52/408 |
| 6,742,313 B2 * | 6/2004 | Ritland et al. | ............. | 52/408 |
| 6,753,362 B2 * | 6/2004 | Khan et al. | ............... | 524/62 |
| 7,146,771 B2 * | 12/2006 | Swann | .................. | 52/518 |

* cited by examiner

*Primary Examiner*—David R. Dunn
*Assistant Examiner*—Erika Garrett
(74) *Attorney, Agent, or Firm*—Stinson Morrison Hecker LLP (57) ABSTRACT

A solid adhesive for use in roofing construction comprising an asphalt, a polymer, a tackifier, and a plasticizer.

32 Claims, 4 Drawing Sheets

COMPOSITION AND METHOD FOR ROOFING MATERIAL INSTALLATION

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The invention relates to composite roof structures and a method of making such structures and systems. Commercial buildings generally are often built with flat or low-slope roof composite roof systems, the slope being about 1-2 inches per foot. The composite roof structures are prepared by adhering roofing material (such as roof insulation and water-proofing materials) to a roof deck. The material is often provided in multiple adhered layers. For example, laps of water-proofing material are often adhered to each other to form a water-tight seal. The present invention is directed to the use of a solid polymer-modified resinous composition in continuous or discontinuous strips or factory applied peel-and-stick form to adhere preformed panels of roof insulation to other pieces of roof insulation, to adhere the insulation to a structural roof deck, or adhere laps of water-proofing material together and/or to the insulation.

DESCRIPTION OF RELATED ART

Many different methods are used to secure roofing materials to the roof deck structure. Mechanical fasteners are traditionally used to secure roofing insulation to the structural supporting deck. However, the use of fasteners is undesirable because the method necessitates puncturing the roofing insulation and the roof deck. Even where the screw-type fasteners are coated with special materials to prevent corrosion and leakage, the multitude of fasteners penetrate the supporting deck system (approximately 50 per 100 square feet) can be hazardous to work around, and in recover re-roofing work, can puncture electrical wiring. These fasteners are also difficult and costly to remove when re-roofing work is performed, thus increasing the overall cost of re-roofing approximately 10%.

In an effort to overcome the shortcomings of mechanical fasteners, methods to adhere roofing materials to the roof deck without mechanical fasteners have been developed. These methods typically utilize a liquid adhesive composition in combination with the roofing insulation materials and the roof deck to form a composite structure. The compositions are generally either water-based or solvent-based liquid adhesives. Water-based adhesives have freezing limitations and limited seasonal use. Many of the solvent-based adhesives have been restricted because they are undesirably odorous, present safety hazards, and are also environmentally unfavorable as they contain volatile organic compounds ("VOCs").

More recently, one or two-part polyurethane adhesives have been used in the roofing industry. For example, U.S. Pat. No. 4,489,176 discloses the use of a two-part polyurethane composition as a construction adhesive for applying insulation on a number of substrates, including roof decks. The polyurethane composition consists of a foam stabilizer, a pre-polymer, a diluent, and optional auxiliary agents the composition is cured by exposure to moisture in the air.

A problem with all of the foregoing adhesive compositions is that they all require the liquid adhesive "set-up" (i.e., cure) by the solvent or the water evaporating, or by the polyurethane absorbing moisture, causing a chemical reaction. The solvent or water-based adhesives may take 2 to 28 days to fully cure. The cure depends upon ambient conditions, the number of insulation layers in the roof system, amount of the adhesive applied and the absorbency of the insulation. While the urethanes can cure within 1 to 3 hours, they are more difficult to apply, are very expensive, and have significant health and environmental issues.

The present invention is thus directed to an adhesive composition useful for adhering roof insulation to other pieces of roof insulation, to various kinds of roof decks, and also to seal the laps of modified bitumen and other types of roofing system cap sheets. The adhesive composition can either be applied in situ or factory applied to the roofing materials.

BRIEF SUMMARY OF THE INVENTION

An object of the present invention is to provide a solid adhesive for adhering typical roofing and waterproofing materials to a substrate.

A further object of the present invention is to provide an adhesive that will not be absorbed, but bonded, into the substrate to which it is affixed.

Still yet another object of the present invention is to provide an adhesive that performs satisfactorily over a wide range of ambient temperatures conditions.

A further object of the present invention is to provide an adhesive that has improved flammability characteristics.

Another object of the present invention is to provide an adhesive that poses substantially no health risk to the applicator.

A further object of the present invention is to provide an adhesive which can be easily applied, without sophisticated equipment, in an exact, measured amount, virtually eliminating waste and extended set-up time.

Another object of the present invention is to provide an adhesive which is environmentally friendly.

Yet another object of the present invention is to provide an adhesive which attaches roofing material to a substrate or itself in an improved time frame.

A further object of the present invention is to provide an adhesive which can be used with a variety of substrates, including but not limited to steel, concrete, lightweight concrete, wood and weathered roofing materials.

A further object of the present invention is to provide an adhesive which can be used with various kinds of roofing materials including for example modified bitumen roofing materials to seal the overlapping portion of rolls of roofing for a watertight seal.

A further object of the present invention is to provide an adhesive which can be used without the requirement of additional heat, in the sense of heat fusing with flame or hot air.

Another object of the present invention is to provide an adhesive which can adequately meet current wind uplift standards without the use of mechanical fasteners or one or two part liquid adhesives.

DETAILED DESCRIPTION OF PREFERRED EMBODIMENT

The invention relates to composite roof systems (10) and their preparation. The roof systems (10) comprise at least one layer of roofing material (20) adhered to a substrate (30) using an adhesive. Exemplary roofing materials are described in U.S. Pat. No. 4,640,703 to Streets et al.; U.S. Pat. No. 4,881,996 to Nussbaum et al.; U.S. Pat. No. 5,447,006 to Zenor, 5,486,249; U.S. Pat. No. to Valaitis et al.; and U.S. Pat. No. 6,117,375 to Garrett et al., all of which are incorporated by reference.

The roofing material includes both conventional waterproofing materials (22) and preformed roofing insulation (24). The water-proofing material (22) includes, but is not limited to, polymeric and elastomeric modified asphaltic membranes, such as modified bitumen roofing products comprising 33% of the current United States roofing market, elastomeric rubber such as EPDM with or without a fleeceback roofing products and other polymeric membranes such as thermoplastic pololefin, and chlorosulfonated polyethylene roofing products comprising an additional 33% of the United States roofing market. The roofing insulation (24) includes, but is not limited to, rigid insulation, such as wood fiber board or fiber and perlite blend board panels, fiberglass preformed boards, foam insulation panels such as styrene and isocyanurate insulating panels (e.g. closed cell polyisocyanurate foam), gypsum and gypsum skin reinforced boards and other composite (combinations of the aforementioned types) insulation boards with or without facer(s).

The substrate (30) comprises a roof deck or one or more pieces of roofing material. The roof deck may be any material that is known to be used as decking material. Non-limiting examples include support decking made from wood plank, plywood, chipboard, concrete, gypsum, lightweight concrete, and ferrous and non-ferrous preformed metal decking. For purposes of the present invention a roof deck also includes prefabricated composite roof systems of a deck and existing roof covering, such as an asphalt built-up roof.

Figure 1:
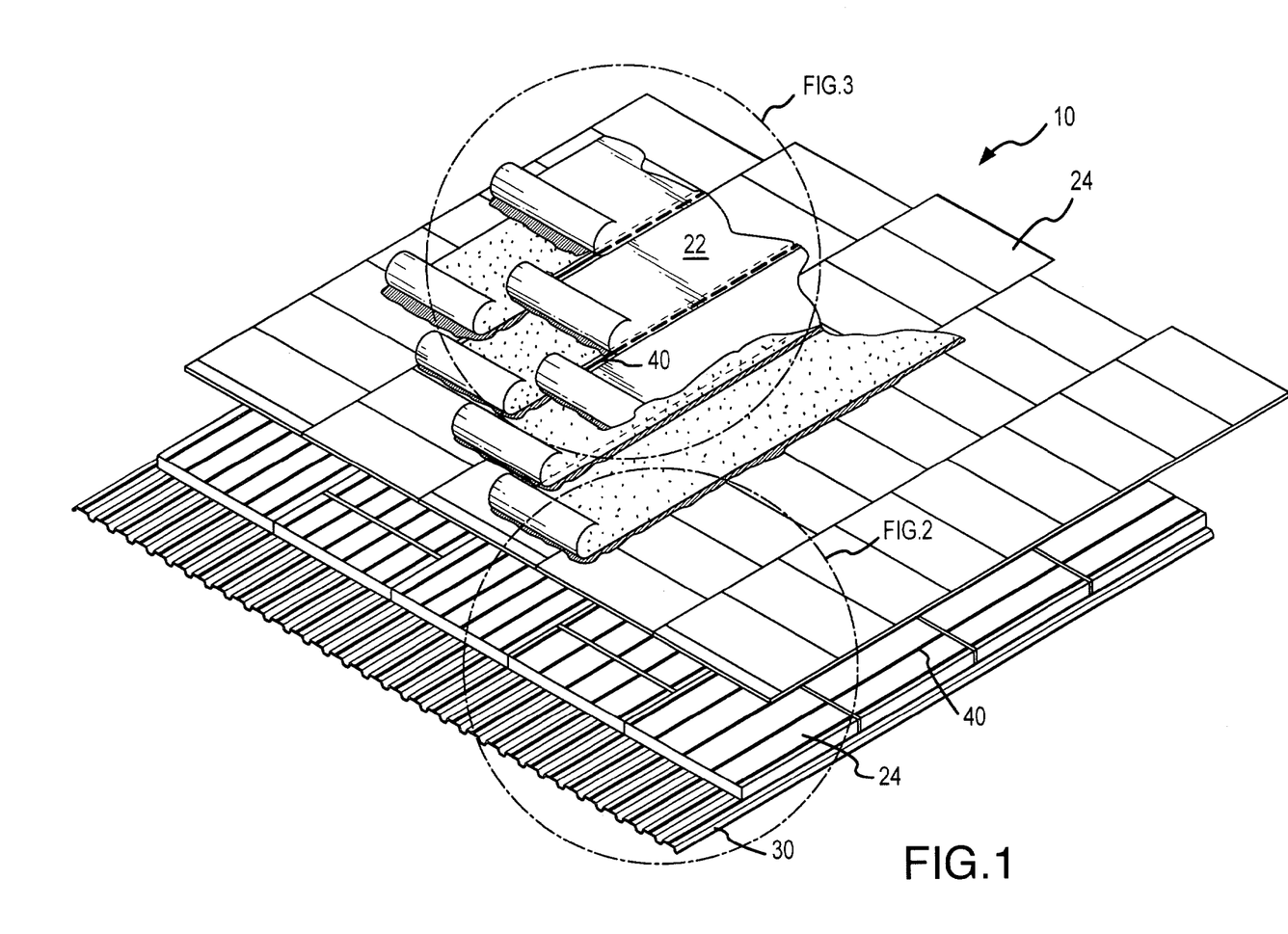
FIG. 1 is an exploded view of the roofing system in accordance with the present invention.
Figure 2:
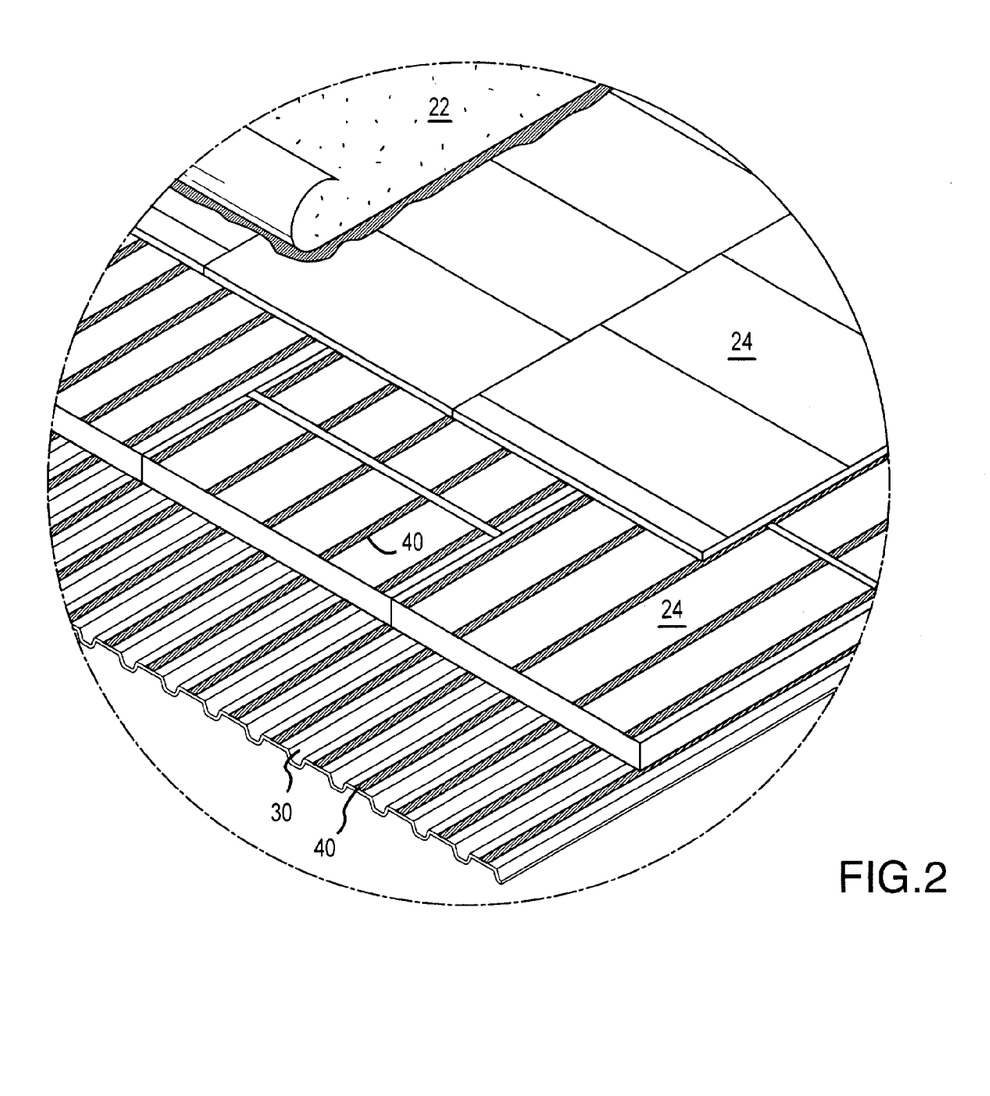
FIG. 2 is a detail view showing the portion of FIG. 1 which illustrates the adhesive of the present invention being applied between pieces of insulation and between the pieces of insulation and the roof deck.
Figure 3:
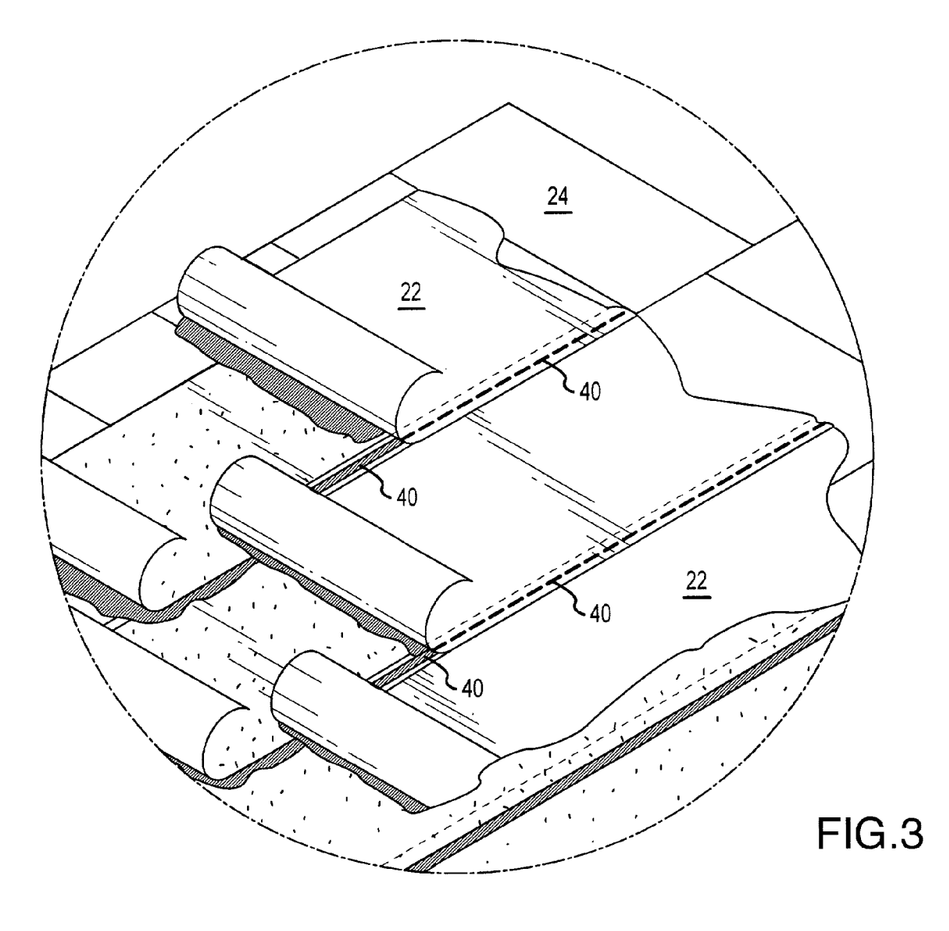
FIG. 3 is a detail view showing the portion of FIG. 1 which illustrates the adhesive of the present invention applied to laps of waterproofing material.

An exemplary roofing system (10) of the present invention is shown in the figures. More specifically, FIGS. 1-3 illustrate a roofing system (10) employing a steel roof deck as a substrate (30) having multiple layers of roofing material thereon. A first layer of insulation (24) comprised of foam insulation board is applied on 12-inch centers using the solid adhesive (40) of the present invention. A second layer of insulation (24) comprised of wood fiber board is thereafter applied using the solid adhesive (40) of the present invention. Lastly, a capsheet of modified bitumen water-proofing material (22) is applied. The water-proofing material is preferably applied with conventional liquid adhesive (e.g. 7U Permastic®). The laps water proofing material (22) are sealed to each other along the edges using the solid adhesive (40) of the present invention.

Although "strips" of adhesive about every 12 inches are illustrated in the drawings, those skilled in the art will recognize that the adhesive (40) of the present invention may be applied in suitable amounts at suitable locations depending on the materials being adhered. For example, it will be appreciated that the adhesive (40) of the present invention may also be used to secure the water proofing material (22) to the roofing insulation (24) instead of using the conventional adhesive. In such a use, the strips or patches of adhesive should preferably be relatively close together (e.g. about every 1 to 6 inches).

As discussed more fully below, the adhesive comprises a polymer-modified asphalt, a tackifier, and a plasticizer. The adhesive is preferably cut into a roll or patch.

1. Asphalt Component

The adhesive of the present invention comprises asphalt. The material preferably comprises about 30 to 90 wt % asphalt, even more preferably about 45 to 75 wt % asphalt, and most preferably about 55 to 65 wt % asphalt.

The term "asphalt" is meant to also be inclusive of all types of asphaltic materials known to those skilled in the art. The term includes materials often designated by the term "bitumen" or "asphalt cements." Thus, the asphalt may be derived from any well known bituminous or asphaltic substance obtained from natural sources (e.g. from native rock asphalt, lake asphalt, and the like) or derived from a number of sources such as petroleum, shale oil, and the like, as well as mixtures of two or more of such materials. The term includes synthetically manufactured asphalt which may be air-blown asphalt, blended asphalt, cracked or residual asphalt, petroleum asphalt, propane asphalt, straight-run asphalt, thermal asphalt, solvent extracted asphalt or asphalt type pitches, and the like.

The asphalts used in the present invention preferably have a ring and ball softening point as measured ASTM D-36 between about 75 to 225° F., even more preferably between about 85 and 150° F., and still most preferably between about 90 and 100° F. Examples of such asphalts include performance graded (PG) asphalts, such as PG 46-40, PG 46-34, PG 46-28, PG 52-40, PG 52-34, PG 52-28, PG 52-22, PG 58-40, PG 58-34, PG 58-22, PG 64-40, PG 64-34, PG 64-28, PG 64-22, PG 70-40, PG 70-34, PG 70-28, PG 70-22, PG 76-40, PG 76-34, PG 76-28, PG 76-22, PG 82-34, PG 82-28, or PG 82-22. Some representative examples of asphalt cements that may be used in the present invention have an ASTM grade of AC-2.5, AC-5, AC-10, AC-20 and AC-40.

In a most preferred embodiment, the adhesive comprises a petroleum-refined asphalt cement, such as either PG 58-22 or AC-10. Such asphalts preferably have a ring & ball softening point of about 90 to 100° F. It would be possible to use oxidized asphalt with a higher softening point as a base, but the lower softening point asphalts offer processing advantages.

B. Polymer Component

The adhesive of the present invention comprises a polymer component. The adhesive preferably comprises about 2 to 50 wt % polymer, even more preferably about 4 to 24 wt % polymer, and most preferably about 8 to 16 wt % polymer.

The polymers of the present invention include various rubber or elastomeric polymers that improve the adhesive's performance over a wide temperature range. The polymers include all types of copolymers, inclusive of random copolymers and block copolymers.

In the preferred embodiment, the adhesive includes both a butadiene-based polymer and isoprene-based polymer. Exemplary butadiene-based polymers include styrene-butadiene-styrene copolymer (SBS), styrene-butadiene rubber (SBR), polybutadiene rubber, acrylonitrile-butadiene rubber (ABR), butadiene-acrylonitrile copolymers, nitrile butadiene rubber (NBR), acrylonitrile-butadiene-styrene (ABS), methacrylate-butadiene-styrene (MBS), methacrylate-acrylonitrile-butadiene-styrene (MABS), butadiene resins (RB), chlorobutadiene polymers, and isobutylene-butadiene copolymers. Exemplary isoprene polymers include styrene-isoprene-styrene copolymer (SIS), polyisoprene rubber isobutylene-isoprene copolymers, and styrene-isoprene copolymers and hydrogenated copolymers thereof. In the most preferred formulation, the composition comprises styrene-butadiene-styrene copolymer (SBS) and styrene-isoprene-styrene copolymer (SIS).

The butadiene-based polymers impart reinforcing characteristics to the asphalt at elevated temperatures (e.g. about 120 to 150° F.), as well as lower the glass transition temperature of the asphalt for improved performance at cold temperatures (less than about 40° F.). The isoprene-based polymers add additional elasticity for expansion and contraction, as well as improved surface tack, which is necessary for immediate adhesion.

Those skilled in the art will recognize that a wide variety of polymers can be used in the present invention. More specifically, in addition to the foregoing butadiene-based and isoprene-based polymers, those skilled in the art will recognize that a variety of other polymers could be added to the composition or used in lieu of or in addition to one or more of the polymers. Non-limiting examples of other suitable polymers that may be employed in the present invention include styrene-ethylene-butylene-styrene copolymer (SEBS), polychloroprene rubber, ethylene-propylene-diethane-terpolymer (EPDM) rubber, natural latex rubber, acrylate copolymers (polyacrylate polymethacrylate) atactic polypropylene (APP), butene polymers, butyl rubber, crumb rubber, fluorine rubber, epichlorohydrin rubber, epoxy group-containing copolymers, ethylene-propylene-unconjugated diene copolymers, ethylene-propylene-styrene copolymers, ethylene-butene copolymers, ethylene-propylene rubber (EPR), ethylene vinyl acetate copolymer (EVA), isobutyl polymers, isobutylene polymers, natural rubbersilicone rubber, perfluoro rubber, polyamide elastomer, polyester elastomer, polyether rubber (e.g., polypropylene oxide, etc.), polyethylene (PE), polynorbornene, polypropyrene (PP), polyvinyl chloride (PVC), polyvinyl dichloride (PVD), polyisobutene rubber, polyvulcanized rubber, polyurethane rubber, urethane rubber, styrene-butylene copolymers, styrene-ethylene-propylene copolymers, silicone rubber, and thiocol rubber.

C. Tackifer

The adhesive of the present invention contains also includes a tackifier. The adhesive preferably comprises about 2 to 40 wt % tackifier, even more preferably about 10 to 20 wt % tackifier, and most preferably about 13 to 17 wt % tackifier.

The term "tackifier" refers to a substance added to improve the initial and extended tack range of the adhesive. Exemplary tackifiers generally include petroleum aromatic hydrocarbon resins, coumarone-indene resins, hydroxy modified resins, modified hydrocarbon resins, alpha-methyl styrene resins. More specifically, the preferred tackifiers include: (1) aliphatic hydrocarbon resins prepared by using, as main starting materials, a C-4 fraction and a C-5 fraction obtained by cracking petroleum, naphtha or the like, mixtures thereof, and isoprene and 1,3-pentadiene in an optional fraction thereof such as a C-5 fraction; (2) aromatic hydrocarbon resins prepared by using, as main starting materials, styrene derivatives and indenes in a C-9 fraction obtained by cracking petroleum, naphtha or the like; (3) aliphatic/aromatic copolymerization hydrocarbon resins prepared by copolymerizing an optional fraction of a C-4 fraction and a C-5 fraction with a C-9 fraction; (4) alicyclic hydrocarbon resins prepared by hydrogenating aromatic hydrocarbon resins; (5) synthetic terpene hydrocarbon resins having structures containing aliphatic, alicyclic and aromatic hydrocarbon resins; (6) terpene hydrocarbon resins prepared by using, as starting materials, alpha, beta-pinenes in turpentine oil; (7) coumarone-indene hydrocarbon resins prepared by using, as starting materials, indenes and styrenes in coal tar naphtha; (8) low-molecular weight styrene resins; (9) rosin hydrocarbon resins; and (10) xylene/formaldehyde resins.

The selection of the tackifier will depend upon the polymer that is used in the adherence material. For example, a C-5 aliphatic hydrocarbon resin is preferably used to improve the adhesive properties of the isoprene-based elastomer. A preferred C-5 aliphatic hydrocarbon is Nevtac 10 commercially available from the Neville Chemical Company (Pittsburgh, Pa.). In contrast, a coumarone-indene resin is preferably used to reinforce the butadiene-based elastomer. A preferred coumarone-indene resin is NP-25, Neville Chemical Company (Pittsburgh, Pa.).

Those skilled in the art will appreciate that the degree of surface tack is directly proportionate to the amount of tackifying resin contained in the formulation. Not enough surface tack and the adhesive will not adhere under all of the required ambient conditions, or to all of the required substrates. Too much tackifying resin will make the adhesive difficult to apply.

D. Plasticizer

The adhesive of the present invention may also contain a plasticizer. The material preferably comprises about 2 to 40 wt % plasticizer, even more preferably about 10 to 20 wt % plasticizer, and most preferably about 13 to 17 wt % plasticizer.

The term "plasticizer" means a substance added to a mixture to help separate the molecular chains. The plasticizer depresses the glass-transition temperature, reduces stiffness and brittleness, and improves processability. Most plasticizers are nonvolatile organic liquids or low-melting point solids, which function by reducing the normal intermolecular forces in a resin thus permitting the macromolecules to slide over one another more freely.

Examples of plasticizers include hydrocarbon oils (e.g. paraffin, aromatic and naphthenic oils), long chain alkyl diesters (e.g. phthalic acid esters, such as dioctyl phthalate, and adipic acid esters, such as dioctyl adipate), sebacic acid esters, glycol, fatty acid, phosphoric and stearic esters, epoxy plasticizers (e.g. epoxidized soybean oil), polyether and polyester plasticizers, alkyl monoesters (e.g. butyl oleate), long chain partial ether esters (e.g. butyl cellosolve oleate).

The preferred plasticizer is a napthenic processing oil, which improves the various rubber polymers ability to blend with the asphalt such as L 2000 (Cross Oil & Refining, Smackover, Ark.).

E. Preparation

The above ingredients are preferably blended in a heated vessel capable of maintaining an elevated temperature, preferably about 275 to 300° F. The asphalt and plasticizer are added to the vessel and stirred at an elevated temperature (preferably about 200 to 300° F., and even more preferably about 230 to 260° F.), at which point the polymer additives are added and blended until they are incorporated into the asphalt, forming a chemical matrix. The tackifier is then added to the mixture, and blended until thoroughly incorporated. The entire blending time is about 60 to 120 minutes.

A polymer-modified solid asphaltic roll (see FIG. 4) or patch (see FIG. 5) is then prepared in accordance with the present invention. In the preferred embodiment, the above blend is cooled slightly (to about 225 to 250° F.), and poured through a machined slot, preferably about 0.125 to 0.25 inch thick and about 1 to 4 inches wide, in a metering apparatus and placed onto a release material. The release material is preferably a silicone-treated release paper (45).

Alternatively, the above ingredients can also be blended in a high-shear sigma blade, or banburry-type mixer, which does not require heat for processing. The blended product is then extruded, using a twin screw Bonnet-type extruder, through about an 0.25 inch machined die onto the same silicone-treated release paper.

Figure 4:
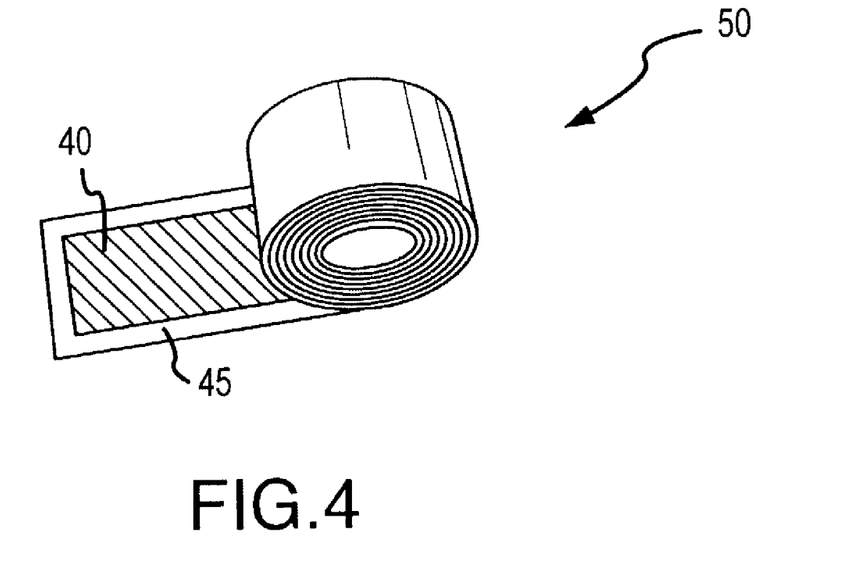
FIG. 4 illustrates a roll employing the adhesive of the present invention.

As discussed above, the adhesive (40) may be wound into rolls or cut into patches. As illustrated in FIG. 4, when used as a membrane lap adhesive, the material is preferably extruded in a continuous length onto a release material (45) and wound into a roll (50). The roll may be any suitable shape or size but is preferably about 20 to 100 feet (preferably about 30 to 40 feet) in length.

Figure 5:
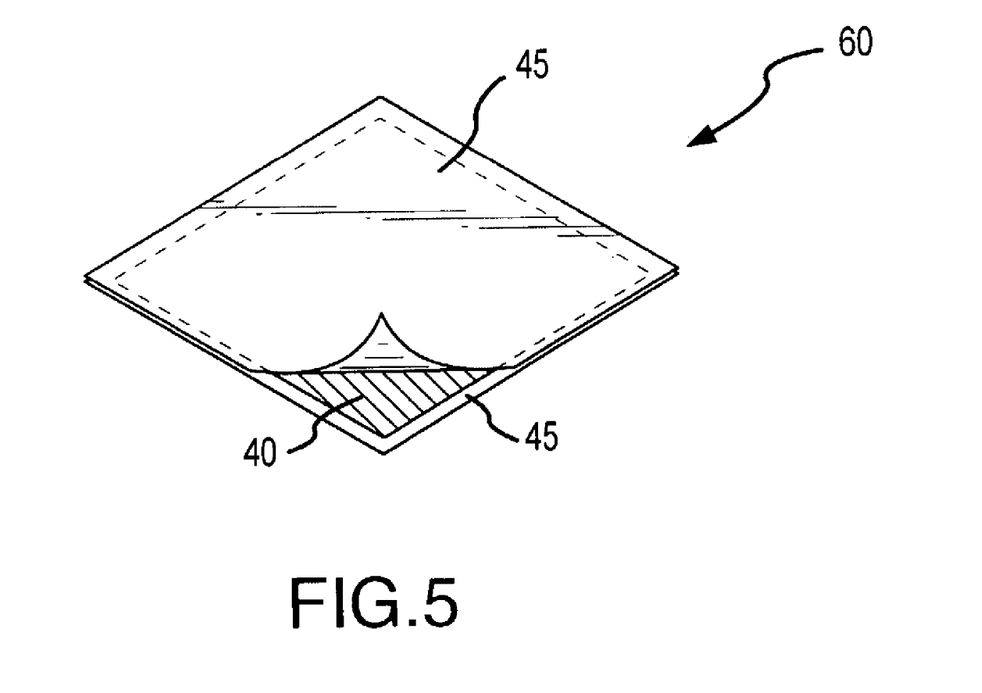
FIG. 5 illustrates a patch employing the adhesive of the present invention.

Alternatively, as shown in FIG. 5, when the adhesive is extruded, an additional layer of release material (45) may be affixed to the top of the adhesive so that release material covers both sides of the adhesive. The adhesive may then be cut into a patch configuration. The patches (60) can be any suitable shape or size. The patches are preferably substantially planar, and preferably about 3×3 inches square and about 0.25 inches thick. The composite product is then ready for application by the end user.

F. Use in Roofing System

To use the adhesive, the release strip(s) are removed from the adhesive. The adhesive is then applied between the roofing material and substrate. As shown in FIGS. 1-3, the adhesive is especially useful for bonding pieces of waterproofing material to each other, adhering to roof insulation together, or adhering the insulation to a structural roof deck. The adhesive can also be factory-applied directly to the insulation board of the roofing membrane during the production process by dispensing or extruding the adhesive through a machined slot to the roofing material and then covered with a release material.

EXAMPLES

It is believed that one skilled in the art can, using the preceding description and without further elaboration, utilize the present invention to its fullest extent. The following preferred specific embodiments are, therefore, to be construed as merely illustrative and not as limiting the remainder of the disclosure in any way whatsoever.

Example 1

| Component | % by Weight |
|---|---|
| PG 58-22 Asphalt | 62 |
| L2000 Napthenic Oil | 8 |
| Solprene 411 SBS Copolymer | 4 |
| Enichem 190 SIS Copolymer | 8 |
| Nevtac 10 Aliphatic Hydrocarbon Resin | 18 |

Example 2

| Component | % by Weight |
|---|---|
| PG 64-22 Asphalt | 65 |
| L2000 Napthenic Oil | 5 |
| NP-25 Cumorene Indene Plasticizer | 15 |
| Solprene 411 SBS Copolymer | 15 |

Example 3

| Component | % by Weight |
|---|---|
| PG 58-22 Asphalt | 65 |
| Nevtac 10 Aliphatic Hydrocarbon Resin | 5 |
| Super Nevtac 99 Aliphatic Hydrocarbon Resin | 15 |
| Elvax 150 EVA Copolymer | 15 |

Example 4

| Component | % by Weight |
|---|---|
| ASTM D312 Type III Oxidized Asphalt | 50 |
| L2000 Napthenic Oil | 16 |
| Enichem 190 SIS Copolymer | 18 |
| Super Nevtac 99 Aliphatic Hydrocarbon Resin | 16 |

While specific embodiments have been shown and discussed, various modifications may of course be made, and the invention is not limited to the specific forms or arrangement of materials and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method for constructing a roof system at ambient temperature conditions comprising:
   providing a roofing substrate selected from the group consisting of roofing insulation and decking material;
   fastening roofing insulation to said roofing substrate using a solid adhesive without the requirement of heat;
   wherein said adhesive comprises asphalt and at least one polymer.

2. The method of claim 1 wherein said asphalt is selected from the group consisting of air-blown asphalt, blended asphalt, cracked asphalt, petroleum asphalt, propane asphalt, straight-run asphalt, thermal asphalt, or solvent extracted asphalt.

3. The method of claim 1 wherein said fastening step uses an adhesive comprising asphalt, and at least one polymer, said solid asphalt having has a ring and ball softening point between about 75 and 227° F.

4. The method of claim 1 wherein said asphalt comprises an oxidized asphalt.

5. The method of claim 1 wherein said adhesive comprises about 30 to 90 wt % asphalt.

6. The method of claim 1 wherein said adhesive comprises about 55 to 65 wt % asphalt.

7. The method of claim 1 wherein said adhesive comprises about 2 to 50 wt % polymer.

8. The method of claim 1 wherein said adhesive comprises about 8 to 16 wt % polymer.

9. The method of claim 1 wherein said polymer comprises a butadiene-based polymer.

10. The method of claim 9 wherein said butadiene-based polymers is selected from the group consisting of styrene-butadiene-styrene copolymer (SBS), styrene-butadiene rubber (SBR), polybutadiene rubber, and acrylonitrile-butadiene rubber (ABR).

11. The method of claim 9 wherein said butadiene-based polymers are selected from the group consisting of nitrile butadiene rubber (NBR), acrylonitrile-butadiene-styrene (ABS), methacrylate-butadiene-styrene (MBS), methacrylate-acrylonitrile-butadiene-styrene (MABS), butadiene resins (RB), chlorobutadiene polymers, and isobutylene-butadiene copolymers.

12. The method of claim 9 further comprising an isoprene-based polymer.

13. The method of claim 12 wherein said isoprene-based polymer is selected from the group consisting of styrene-isoprene-styrene copolymer (SIS) and polyisoprene rubber.

14. The method of claim 12 wherein said isoprene-based polymer is selected from the group consisting of isobutylene-isoprene copolymers and styrene-isoprene copolymers.

15. The method of claim 12 wherein said butadiene-based polymer comprises styrene-butadiene-styrene copolymer and wherein said isoprene-based polymer comprises styrene-isoprene-styrene copolymer.

16. The method of claim 1 wherein said adhesive further comprises a tackifier.

17. The method of claim 16 wherein said adhesive comprises about 2 to 40 wt % tackifier.

18. The method of claim 16 wherein said adhesive comprises about 13 to 17 wt % tackifier.

19. The method of claim 16 wherein said tackifier is selected from the group consisting of petroleum aromatic hydrocarbon resins, coumarone-indene resins, hydroxy modified resins, modified hydrocarbon resins, and alpha-methyl styrene resins.

20. The method of claim 1 wherein said adhesive further comprises a plasticizer.

21. The method of claim 20 wherein said adhesive further comprises about 2 to 40 wt % plasticizer.

22. The method of claim 21 wherein said adhesive comprises about 13 to 17 wt % plasticizer.

23. The method of claim 21 wherein said plasticizer is selected from the group consisting of hydrocarbon oils, long chain alkyl diesters, and sebacic acid esters.

24. The method of claim 1 wherein said roofing substrate comprises roofing insulation.

25. The method of claim 24 wherein said roofing insulation is comprised of a preformed insulation board made of fibers, mineral aggregate, or foam plastic.

26. The method of claim 1 wherein said roofing substrate comprises decking material.

27. The method of claim 26 wherein said decking material is comprised of at least one of the group consisting of wood plank, plywood, concrete, gypsum, and metal decking and prefabricated composites of same.

28. The method of claim 1 wherein said adhesive comprises a solid patch having a release material on a surface of said patch, and wherein said method further comprises the step of removing said release material from said patch, and then placing said solid adhesive between said roofing insulation and said roofing substrste.

29. The method of claim 28 wherein said release material comprises a release film or paper.

30. The method of claim 29 wherein said release material is silicon-coated.

31. The method of claim 1 wherein said adhesive is in the form of a roll having a releas material on a surface of roll, and wherein said method further comprises the step of removing said release material from said roll of adhesive, and then placing said solid adhesive between said roofing insulation and said roofing substrate.

32. The method of claim 1 wherein said adhesive comprises a roll.

* * * * *

UNITED STATES PATENT AND TRADEMARK OFFICE
CERTIFICATE OF CORRECTION

PATENT NO. : 7,234,284 B2  Page 1 of 1
APPLICATION NO. : 10/379229
DATED : June 26, 2007
INVENTOR(S) : Paradise et al.

It is certified that error appears in the above-identified patent and that said Letters Patent is hereby corrected as shown below:

Column 3,
Line 26, delete "Zenor, 5,486,249; U.S. Pat. No. to Valaitis" and insert -- Zenor; U.S. Pat No. 5,486,249 to Valaitis -- therefor.

Column 4,
Line 46, insert -- PG 58-28 -- between "PG 58-34" and "PG 58-22".

Column 10,
Line 39, delete "releas" and insert -- release -- therefor.

Line 46, insert the following claim after Claim 32.

-- 33. The method of claim 1 wherein the substrate has a slope of about 1 to 2 inches per foot. --

Signed and Sealed this

Eighteenth Day of March, 2008

JON W. DUDAS
*Director of the United States Patent and Trademark Office*